Aug. 26, 1924.

J. U. THUAU 1,506,510

APPARATUS FOR SKINNING ANIMALS

Filed June 7, 1923   2 Sheets-Sheet 1

Jules Urbain Thuau
INVENTOR;
By
his Attorney.

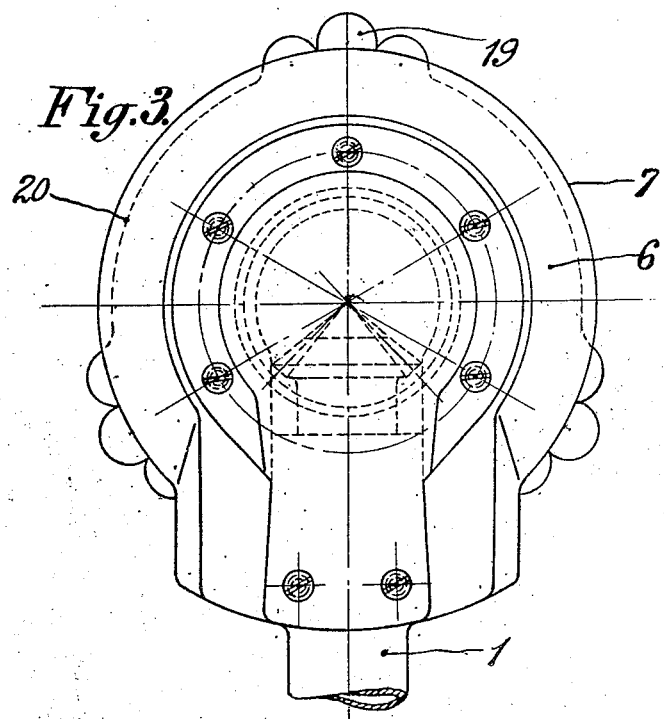
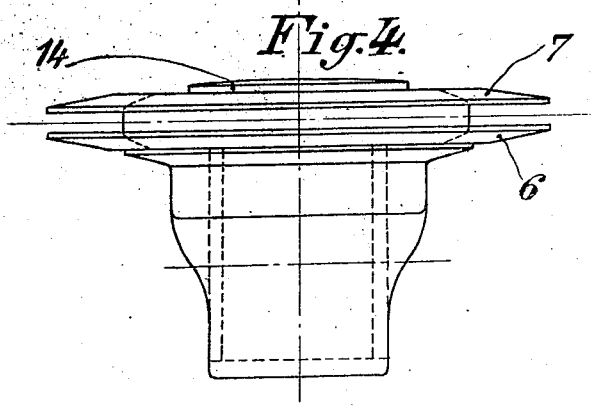

Patented Aug. 26, 1924.

1,506,510

UNITED STATES PATENT OFFICE.

JULES URBAIN THUAU, OF PARIS, FRANCE, ASSIGNOR TO SOCIETE INDUSTRIELLE DE DEPOUILLE MECANIQUE DES ANIMAUX, OF PARIS, FRANCE.

APPARATUS FOR SKINNING ANIMALS.

Application filed June 7, 1923. Serial No. 643,875.

*To all whom it may concern:*

Be it known that I, JULES URBAIN THUAU, French citizen, residing at Paris, France, have invented new and useful Improvements in Apparatus for Skinning Animals, of which the following is a specification.

The invention relates to apparatus for mechanical skinning, the improvements enabling a perfect result to be obtained without fear of damaging the skin and the meat of the animal being skinned.

These improvements consist essentially in providing an apparatus of this kind comprising three parts:

1. Any kind of mobile motor, preferably electric, of universal type capable of being connected up with any source of current and capable of taking up any desired position.

2. A flexible drive whose extremities are furnished with a bayonet connection which can engage on the shaft of the motor and of the skinning apparatus very easily and very quickly.

3. A skinning apparatus, a rotating, non-cutting and interchangeable disk, having rounded or triangular embossments.

The separating tool can consist of a disk, fitted with round or triangular embossments, non-cutting, smooth, rough or grooved to facilitate the work of separation.

The invention is hereinafter fully described with reference to the accompanying drawings, showing, by way of example and diagrammatically, a form of construction of a tool for skinning animals.

Figure 1:
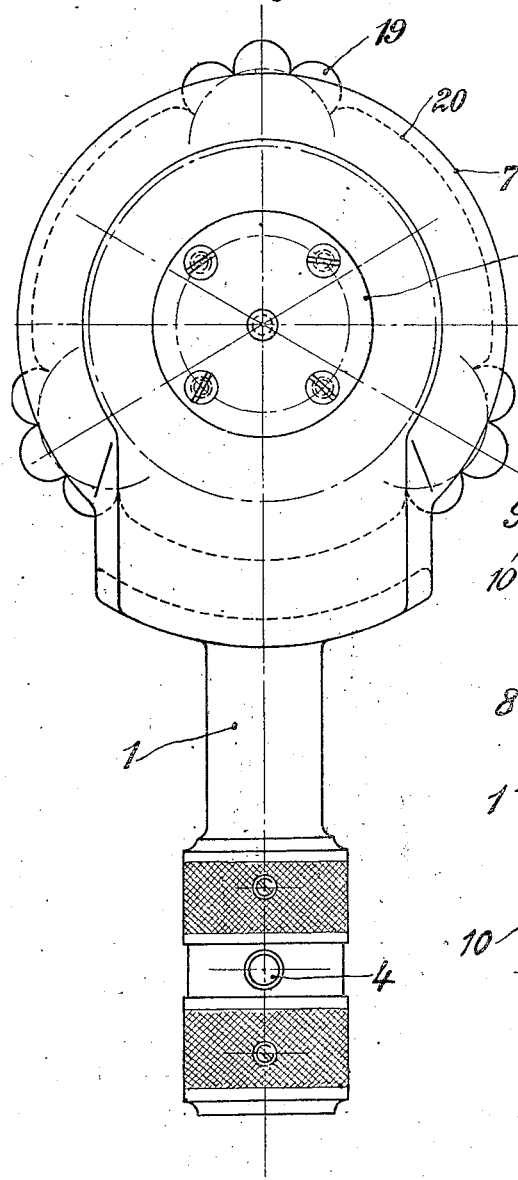
Figure 2:
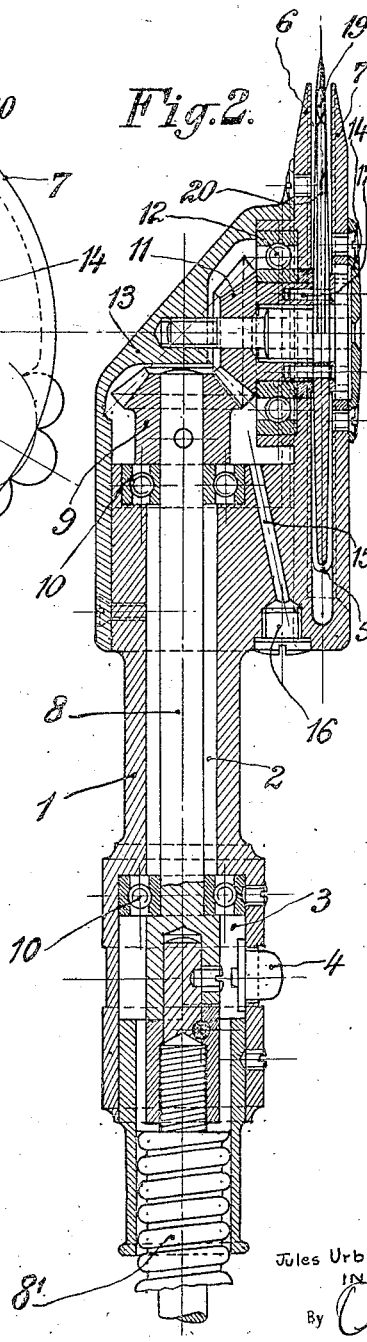

Figures 1 and 2 show an elevation of the flat side and a vertical section, of the handle of the apparatus; Figs. 3 and 4 show the upper part seen from the other side of the apparatus and a plan view.

In the drawings, 1 indicates the sleeve with a hollow centre 2, to receive the flexible shaft and at 3 to have, if necessary, a switch button 4, it also has a slot 5 between two protecting guards 6, 7.

A flexible member $8^1$, ending in a bayonet connection, is secured to the end of a shaft 8 upon which is pinned a pinion wheel 9 carried by ball bearings 10 and engaging with another pinion 11 likewise carried in a ball bearing 12 whose shaft is held in the cover 13 forming casing and in a plate 14 secured to the protecting guard 7.

Lubrication of the movement is ensured by thick grease which is introduced through a passage 15 and which is closed by the plug 16 in the casing.

An interchangeable separating tool is fixed, by screws 17 or otherwise, on the hub of the pinion 11 and turns therewith, while the plate 14 permits of the easy replacement of the tools.

The separating tools are, preferably, of disk form 20 carrying, on their surface, embossments 19, rounded or triangular, but non-cutting, the disk form giving greater solidity avoiding air currents and the formation of froth on the meat during the operation.

I claim:—

A motor driven skinning tool comprising a handle and a smooth substantially circular rotating disc having non-cutting projections along its periphery, and adapted to set up no currents of air when rotating.

JULES URBAIN THUAU.